United States Patent
Nielsen et al.

(10) Patent No.: US 7,517,374 B2
(45) Date of Patent: Apr. 14, 2009

(54) PROCESS FOR THE PREPARATION OF A HYDROGEN-RICH STREAM

(75) Inventors: Poul Erik Højlund Nielsen, Fredensborg (DK); John Bøgild Hansen, Copenhagen Ø (DK); Niels Christian Schiødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 227 days.

(21) Appl. No.: 10/548,951

(22) PCT Filed: Mar. 25, 2004

(86) PCT No.: PCT/EP2004/003160

§ 371 (c)(1),
(2), (4) Date: Sep. 15, 2005

(87) PCT Pub. No.: WO2004/087566

PCT Pub. Date: Oct. 14, 2004

(65) Prior Publication Data

US 2006/0168888 A1    Aug. 3, 2006

(30) Foreign Application Priority Data

Apr. 1, 2003  (DK)  ............... 2003 00499
Apr. 7, 2003  (DK)  ............... 2003 00532

(51) Int. Cl.
  C01B 3/24  (2006.01)
  C01B 3/36  (2006.01)
  C01B 3/32  (2006.01)
  C01B 3/26  (2006.01)

(52) U.S. Cl. ............... 48/198.3; 48/197 R; 48/198.7; 423/648.1; 423/650; 423/651

(58) Field of Classification Search ............... 48/198.3, 48/197 R, 198.7; 423/648.1, 651, 650
See application file for complete search history.

(56) References Cited

U.S. PATENT DOCUMENTS 4,091,086 A * 5/1978 Hindin et al. ............ 423/648.1
4,481,305 A    11/1984 Jorn et al.
5,626,794 A    5/1997 Bhattacharyya et al.

(Continued)

FOREIGN PATENT DOCUMENTS

EP    0 754 649    1/1997

(Continued)

OTHER PUBLICATIONS

D. Romani, et al. "Large-Scale Production of Fuel DME From Natural Gas", Second International Oil, Gas and Petroleum Congress, Tehran, May 2000.

(Continued)

*Primary Examiner*—Walter D Griffin
*Assistant Examiner*—Lessanework Seifu
(74) *Attorney, Agent, or Firm*—Dickstein Shapiro LLP

(57) ABSTRACT

A process for the preparation of a hydrogen-rich stream comprising contacting a process gas containing carbon monoxide and water, the process gas further including dimethyl ether or a dimethyl ether/methanol mixture in at least one shift step in the presence of an ether hydration catalyst selected from the group of solid acids and a methanol decomposition catalyst comprising copper, zinc and aluminum and/or chromium.

8 Claims, 1 Drawing Sheet

Figure 1:
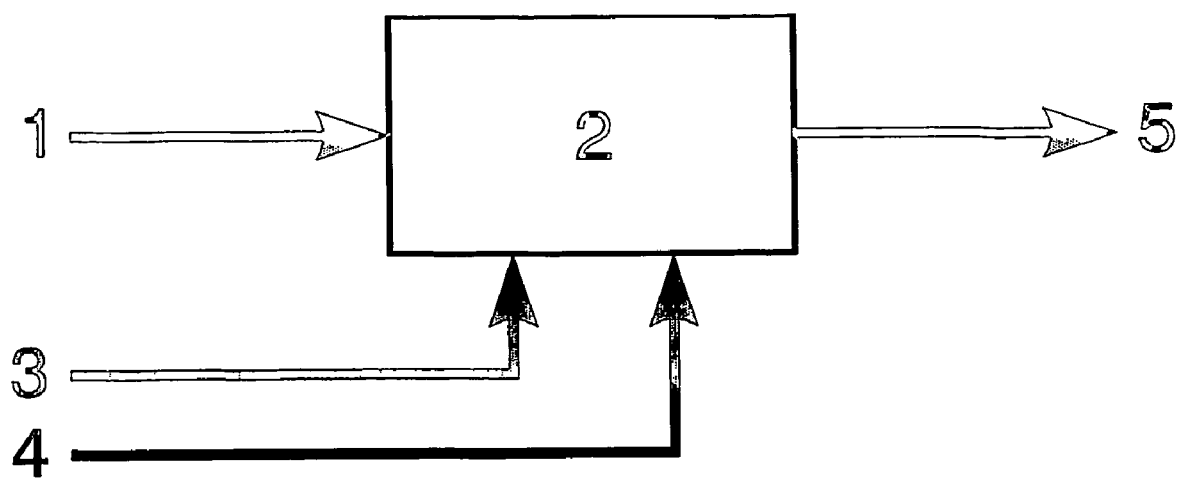

U.S. PATENT DOCUMENTS 5,837,217 A * 11/1998 Nielsen et al. ........... 423/648.1
6,361,757 B1 * 3/2002 Shikada et al. .............. 423/651

FOREIGN PATENT DOCUMENTS

| | | |
|---|---|---|
| EP | 1 129 988 | 9/2001 |
| JP | 2003-10685 | 1/2003 |
| JP | 2003-47853 | 2/2003 |

OTHER PUBLICATIONS

I. Dybkjaer, et al., "Large-Scale Production of Alternative Synthetic Fuels from Natural Gas", Studies in Surface Science and Catalysis, vol. 107, p. 99, 1997.

* cited by examiner

PROCESS FOR THE PREPARATION OF A HYDROGEN-RICH STREAM

The invention relates to a process for the preparation of a hydrogen-rich stream by reforming dimethyl ether, and it provides a facile process for boosting capacity of fuel-based hydrogen plants.

Hydrogen plants can utilise fuels such as natural gas, liquid hydrocarbons or solid fuels like coal or biomass. In these plants, hydrogen production takes place in four consecutive procedures—feed purification followed by steam reforming (or gasification), water gas shift (WGS) and purification. These procedures are further described in Kirk-Othmer and Ullman.

Decomposition of DME to hydrogen proceeds in a two step reaction. In a first reaction the ether is hydrated to methanol by the reaction:

$$CH_3OCH_3 + H_2O \rightarrow 2CH_3OH \quad (1)$$

The hydration reaction may take place in either gaseous or liquid phase. Methanol produced during hydration of DME is in a second step decomposed to carbon oxides and hydrogen:

$$CH_3OH + H_2O \rightarrow CO_2 + 3H_2 \quad (2)$$

$$CO_2 + H_2 \rightarrow CO + H_2O \quad (3)$$

This reaction can also take place both in gas and liquid phase. Reaction (1) proceeds in the presence of weak acids at a very low reaction rate and the reaction is thermodynamically unfavourable to methanol. Methanol decomposition by the above reactions (2) and (3) is known to be catalyzed by a solid catalyst usually based on copper, zinc and aluminum oxides. Thermodynamically it is favoured by high temperature, low pressure and a high steam content.

It has furthermore been observed that the overall reaction of DME to hydrogen rich gas:

$$CH_3OCH_3 + 3H_2O \rightarrow 2CO_2 + 6H_2 \quad (4)$$

proceeds at reasonable reaction rates and at high product yield and selectivity for the formation of hydrogen and carbon oxides, when overcoming the equilibrium limitations of DME hydration reaction (1) by separating produced methanol as it forms by reacting methanol to hydrogen and carbon oxides according to the above reactions (2) and (3).

The WGS reaction is described in the following equation:

$$CO + H_2O \rightarrow CO_2 + H_2 \quad (5)$$

It is a slightly exothermic reaction used for producing more hydrogen. Known WGS catalysts in industrial high temperature shift (HTS) applications are high-temperature catalysts that are chromium-supported and iron-based, and they are sometimes promoted with copper. The operational range for the HTS is typically 340-360° C. inlet temperature and with exit temperatures that are approximately 100° C. higher. The operational range of the inlet temperature for low temperature shift (LTS) catalysts is from 200° C. (or 20° C. above the dew point of the gas). The inlet temperature should be kept as low as possible. Further details on catalysts for shift reactions and operating temperature are given in Catalyst Handbook, 2. Ed. Manson Publishing Ltd. England 1996.

In addition to these catalysts, Haldor Topsøe A/S has marketed a medium-temperature shift catalyst that is Cu-based and capable of operating at temperatures up to 310° C. Various vendors offer sulphur-tolerant catalysts for the gasification-based plants. However, these plants are not widely used for hydrogen production.

DME is produced on a scale of more than 100,000 t/y. Basically DME is today produced by hydration of natural gas derived methanol and is mainly used as an aerosol propellant.

However, it has been found that DME is an excellent diesel fuel as well as gas turbine fuel. It can also be used as an LPG substitute so it can be envisaged that it will be produced in very large plants at places where natural gas is cheap, see for instance I. Dybkjær, J. B. Hansen "Large-Scale Production of Alternative Synthetic Fuels from Natural Gas", Studies in Surface Science and Catalysis, Vol. 107, page 99, 1997 and D. Romani, C. Scozzesi, H. Holm-Larsen, L. Piovesan: "Large-Scale Production of Fuel DME from Natural Gas", Second international Oil, Gas & Petrochemical Congress, Tehran, May 2000 for details on DME applications, production technology and economics.

In the future, it is thus expected that DME can be available in large quantities and to a price that on an energy basis might be significantly lower than the oil price.

In recent years there have been numerous studies of steam reforming of methanol for producing hydrogen and in particular hydrogen for fuel cells. The disadvantage of the steam reforming process is that the heat of reaction has to be supplied through a wall and the equipment as such becomes cumbersome.

EP Patent No. 754649 incorporated herein by reference discloses a process for preparation of a hydrogen-rich gas, where dimethyl ether is reacted with steam in presence of a solid acid ether hydrolysis catalyst and a methanol decomposition catalyst.

Catalysts for low temperature steam reforming of methanol are copper based or optionally based upon noble metals. Some companies, for instance Haldor Topsøe A/S, offer commercial products.

It is an objective of the invention to provide a shift process for production of a hydrogen-rich stream from dimethyl ether by utilising catalysts capable of operating at a wide range of temperatures.

According to the invention, there is provided a process for the preparation of a hydrogen-rich stream comprising contacting a process gas containing carbon monoxide and water, the process gas further including dimethyl ether or a dimethyl ether/methanol mixture, in at least one shift step in the presence of an ether hydration catalyst selected from the group of solid acids and a methanol decomposition catalyst comprising copper, zinc and aluminum and/or chromium.

The process can be carried out by adding dimethyl ether or a dimethyl ether/methanol mixture to the feed stream to a water gas shift reactor containing a solid acid catalyst and a Cu-based catalyst comprising zinc, aluminum and/or chromium and resulting in a catalytic hydration of dimethyl ether and catalytic decomposition of methanol along with the water gas shift reaction. In the isothermal case, the heat released by the exothermic Water Gas Shift Reaction balances the heat used for the endothermic steam reforming of dimethyl ether. The sensible heat in the feed streams may further be used in the process whereby a significant larger amount of dimethyl ether may be steam reformed.

The carbon monoxide-containing gas can for instance be a synthesis gas.

Dimethyl ether, methanol and water can be used in the process in vapour form. However, water and methanol can also be used in liquid form.

The catalysts used in the process of the invention are capable of operating both at lower temperatures (for instance at 200° C.) and at temperatures above 350° C.

By using this catalyst in the process the hydrogen production from the unit may be boosted up to 100%. Alternatively the process can be used to decrease the load on the reforming section. A capacity increase of ammonia plants is also provided by applying the process of the invention in such a plant.

The endothermic overall dimethyl ether reaction to $H_2$-rich gas:

$$CH_3OCH3+3H_2O \rightarrow 6H_2+2CO_2 \quad (4)$$

obtains the necessary heat of reaction from the sensible heat in the gas as well as from the reaction heat from the WGS reaction. The catalysts utilised in the process of the invention tolerate the maximum inlet temperature and are still active at a much lower temperature primarily determined by the desire to keep the outlet dimethyl ether concentration as low as possible (typically in the temperature range from 240-320° C.).

The invention is applicable to a hydrogen plant on any scale. In addition the invention proves to be particularly useful for peak shaving purposes in gasification based combined cycle power plant or in fuel processors, e.g. by injecting DME and optionally a (liquid) methanol water mixture into the shift reactor.

The carbon monoxide-containing gas can be for example a synthesis gas from a reforming process. Examples of reforming processes are the steam reforming process and the autothermal reforming process.

The figure illustrates a specific embodiment of the process of the invention. Synthesis gas 1 is injected into a shift section 2. A stream of dimethyl ether or a dimethyl ether/methanol mixture 3 and water 4 are also injected into the shift section 2, where the shift step occurs. The water 4 can be added as vapour or as liquid. The shift section contains a catalyst having activity for the hydration of ether to methanol, and a catalyst for both the shift conversion reaction of the carbon monoxide and the steam reforming reaction of methanol. The heat required for the endothermic methanol hydrolysis and steam reforming reactions of methanol is provided by the heat obtained in the shift conversion reaction. The product is a hydrogen-rich stream 5.

The catalyst suitable for the shift and methanol decomposition process contains copper, zinc, aluminum and/or chromium and the ether hydration catalyst is a solid acid. The dimethyl ether hydration catalyst comprises zeolitic material, alumina silicate, silica alumina and alumina and mixtures thereof. Preferably, the hydration catalyst comprises acidic zeolites, most preferably ZSM-5 in its H-form. A suitable crystalline aluminosilicate zeolite ZSM-5 suitable for use in the process of the invention is described more fully in U.S. Pat. No. 3,702,886 incorporated herein by reference.

The DME hydration catalyst may be physically admixed with the methanol decomposition catalyst based upon, preferably, Cu—Zn-alumina such as MDK-20 from Haldor Topsøe A/S, in a weight ratio of between 1:5 and 5:1. The catalysts may therefore be loaded in the DME reactor as a physical mixture or as a layered bed with alternating DME hydration and methanol decomposition catalyst particles. It is preferred to employ a fixed bed of catalyst compositions comprising combined methanol formation, water gas shift and methanol dehydration activity. Such catalysts may be prepared by e.g. coprecipitation of the catalytic active materials according to known catalyst preparation methods described in the literature.

Prior to contact with the feed gas, the catalysts are brought in their active form, which for the hydration catalyst is the hydrogen form obtained by ion exchange of the catalyst with a proton donating solution. The methanol decomposition catalyst is conventionally activated through contacting the catalyst with a reducing gas.

Using this catalyst results in an increase in capacity and the catalyst is active at both lower temperatures and at temperatures above 350° C.

Suitable forms of the catalyst are extrudates, pellets, granulates and the like being conventional used in a fixed bed of solid catalyst particles.

The shift section can comprise a single shift step or a combination of shift steps. An embodiment of the invention comprises a process where at least one shift step is a medium-temperature or a high temperature shift step. Another embodiment of the invention comprises a process, where the medium or high temperature shift step is followed by a low temperature shift step. Other combinations of shift steps are also possible and are emcompassed by the process of the invention.

The synthesis gas steam can be obtained from various sources for example a steam reformed gas, a secondary reformer, an autothermal reformer or an upstream pre-reformer.

A particular embodiment of the invention comprises the process where a hydrocarbon stream and steam are first pre-reformed to obtain methane and then steam reformed to obtain a gas containing carbon monoxide, before entering the shift step in the process of the invention. After the shift reaction the hydrogen produced is separated and unconverted dimethyl ether is recycled to the pre-reformer or to the shift step.

The advantages of the process of the invention are illustrated in the following examples.

EXAMPLES

The following catalysts have been used in the examples:

| Catalyst A: | MKl21 - methanol synthesis catalysts from Haldor Topsøe A/S comprising oxides of copper, zinc and aluminum. |
|---|---|
| Catalyst B: | ZSM-5, a crystalline aluminosilicate zeolite described in U.S. Pat. No. 3,702,886. |

Examples 1-3 serve to demonstrate the scope of the invention using a mixture of the above-mentioned catalysts. In these examples, it is demonstrated how hydrogen production, may be improved significantly and with high efficiency.

Example 1

15 g of catalyst A is mixed with 15 g of Catalyst B. The catalyst is reduced in diluted hydrogen (1-5 vol %) at 185° C. and at a pressure of 0.1 MPa. After reduction of the catalyst a synthesis gas comprising 43.1% hydrogen, 14.3% carbon monoxide, 11.1% carbon dioxide and 31.5% nitrogen is used. The pressure is increased to 2.5 MPa and the temperature is raised to 237° C. A mixture of DME and water in the molar ratios of 1 to 3 is co-fed with the synthesis gas. The dry gas flow is 50 Nl/h whereas the flow of DME and water is 6.8 Nl/h. In addition to the dry synthesis gas and the DME/water mixture, 20.0 g/h of water is evaporated and co-fed with the other components. The exit gas is analysed after condensation of residual steam and methanol formed. At these conditions the CO exit concentration amounts to 0.58% and the $CO_2$ exit concentration is 22.2%.

At these conditions, the exit temperature is measured to be 244° C. immediately after the catalyst bed and the liquid flow exit in the reactor is 15.1 g/h with a methanol concentration of 1.27% wt/wt and only traces of DME. The dry exit gas contains 0.035 mole % DME. This corresponds to a DME conversion C(DME) of:

$$C(M) = (DME\ flow_{inlet} - DME\ flow_{exit})/DME\ flow\ inlet * 100\% = 98.52\%.$$

The carbon monoxide conversion is calculated as C(CO):

$$C(CO) = (CO\ flow_{inlet} - CO\ flow_{exit})/CO\ flow\ inlet * 100\% = 94.35\%.$$

The productivity of hydrogen is calculated as Prod(H2):

$$Prod(H2) = (hydrogen\ flow_{exit} - hydrogen\ flow_{inlet})/mass\ of\ catalyst = 547\ Nl\ H2/kg/h.$$

The results are summarized in Table 1.

Examples 2 and 3

Example 1 was repeated in Examples 2 and 3 with the exception that the inlet temperature was raised to 278° C. and 318° C., respectively.

TABLE 1

|  | Example | | |
| --- | --- | --- | --- |
|  | 1 | 2 | 3 |
| Inlet Temp (° C.) | 237 | 278 | 318 |
| Exit Temp (° C.) | 244 | 278 | 313 |
| Inlet dry flow (Nl/h) | 50 | 50 | 50 |
| Inlet DME/water (1:3) (Nl/h) | 6.8 | 6.8 | 6.8 |
| Inlet steam flow (g/h) | 20.0 | 20.0 | 20.0 |
| Exit dry flow (Nl/h) | 69.6 | 70.0 | 69.7 |
| Exit liquid flow (g/h) | 15.2 | 15.1 | 15.4 |
| [MeOH]$_{exit}$ (% wt/wt) | 1.27 | 0.36 | 0.10 |
| [CO]$_{exit}$ (mole %) | 0.58 | 0.86 | 1.39 |
| C(DME) (%) | 98.52 | 99.90 | 99.99 |

TABLE 1-continued

|  | Example | | |
| --- | --- | --- | --- |
|  | 1 | 2 | 3 |
| C(CO) (%) | 94.35 | 91.57 | 86.4 |
| Prod(H$_2$) (Nl/kg/h) | 547 | 555 | 545 |

The invention claimed is:

1. A process for the preparation of a hydrogen-rich stream comprising:
   steam reforming of a hydrocarbon feed stock to obtain a process gas containing carbon monoxide, hydrogen and water; and
   contacting the process gas in presence of an amount of dimethyl ether or a dimethyl ether/methanol mixture in a subsequent at least one shift step in the presence of an ether hydration catalyst selected from the group consisting of solid acids and a methanol decomposition catalyst consisting of copper, zinc and aluminum and/or chromium.

2. Process according to claim 1, wherein the dimethyl ether hydration catalyst comprises zeolitic material, alumina silicate, silica alumina and alumina and mixtures thereof.

3. Process according to claim 1, wherein the dimethyl ether hydration catalyst comprises ZSM-5 in its hydrogen form and/or compounds based on silica-alumina.

4. A process according to claim 1, wherein the at least one shift step is a Medium Temperature or High Temperature shift step.

5. A process according to claim 4, wherein the Medium Temperature or High Temperature shift step is followed by a Low Temperature shift step.

6. Process according to claim 1, wherein the hydrocarbon feed is pre-reformed before the reforming step.

7. Process according to claim 6, wherein unreacted dimethyl ether is separated from the shift step effluent and recycled to the pre-reforming step or the shift step.

8. Process according to claim 1, wherein the shift inlet temperature is at least 200° C.

* * * * *